July 3, 1928.

E. V. COULSTON 1,675,924

COMBINED ELECTRICAL STOVE AND TOASTER

Filed March 16, 1927    2 Sheets-Sheet 1

INVENTOR:
EARL V. COULSTON
BY Markel & Underwood
ATTORNEYS

July 3, 1928.
E. V. COULSTON
1,675,924
COMBINED ELECTRICAL STOVE AND TOASTER
Filed March 16, 1927      2 Sheets-Sheet 2
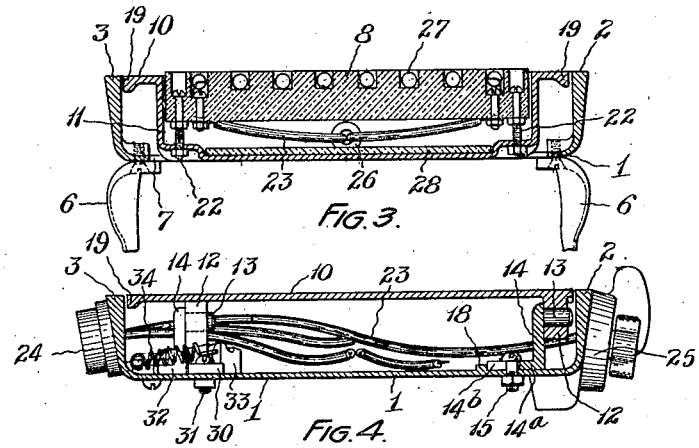
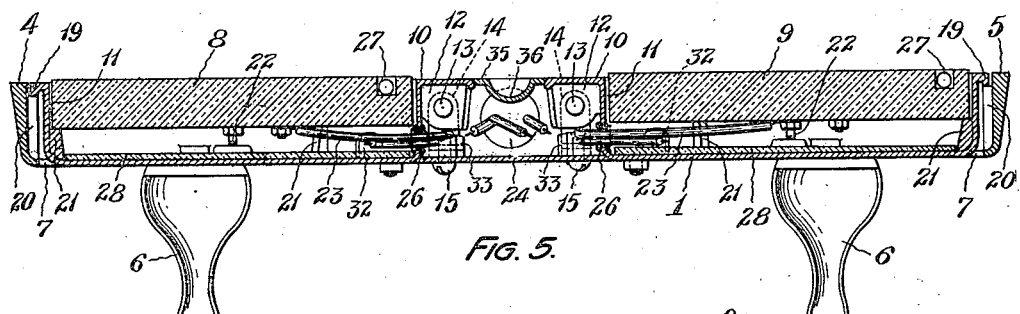
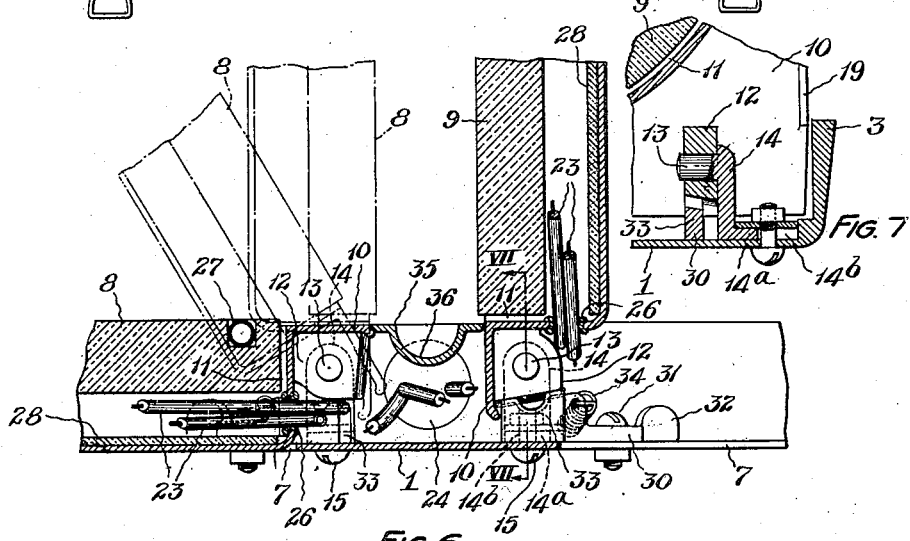
INVENTOR:
EARL V. COULSTON
BY *Markel & Underwood*
ATTORNEYS.

Patented July 3, 1928.

1,675,924

UNITED STATES PATENT OFFICE.

EARL V. COULSTON, OF CLEVELAND, OHIO.

COMBINED ELECTRICAL STOVE AND TOASTER.

Application filed March 16, 1927. Serial No. 175,677.

The invention relates to electrical utensils adapted for use in the home, the object being to provide a utensil of this nature adapted for use as a cooking stove, but which may be instantly converted into an electric broiler or toaster, operating simultaneously on both sides of the object to be heated.

The invention consists in a plurality of hot plates so mounted that they may either lie in a horizontal plane to support a cooking vessel, or a pair of them may be caused to face each other in separated or spaced relation so as to permit meat, bread, or the like to be inserted between them to heat it simultaneously on opposite sides.

In the annexed drawings showing one embodiment of the invention;

Fig. 3 is a vertical section taken on line III—III of Fig. 2.

Fig. 4 is a vertical cross-section taken on line IV—IV of Fig. 2.

Fig. 5 is a vertical cross-section taken lengthwise through the utensil on line V—V of Fig. 2.

Fig. 6 is an enlarged view of the central portion of Fig. 5, showing the means for holding the hot plates in vertical position.

Fig. 7 is a vertical cross-section through one of the pivotal connections of the hot plate frame with the main frame, taken on line VII—VII of Fig. 6.

Figures 1, 2, 8:
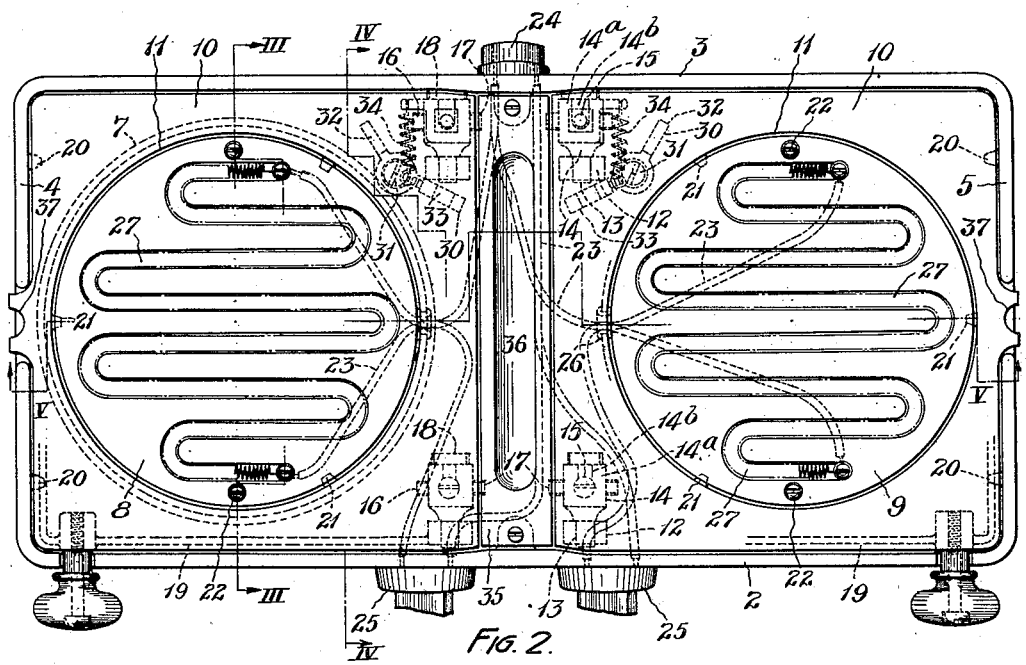
Figure 1 is a front elevation of the utensil, the hot plates being shown in their horizontal position in full lines and in their alternative position in broken lines and with an open-work holder in position between them shown in full lines.
Fig. 2 is a plan view of the utensil with the hot plates in their horizontal position.
Fig. 8 is a side elevation of an open-work holder adapted to cooperate with the hot plates when set in vertical opposed relation, shown on a reduced scale.

Referring to the drawings in detail in which the same reference number is used throughout to designate the same part, a main frame is composed of a horizontal base plate 1 having an upstanding marginal rim which forms side members 2, 3 and end members 4, 5. The base plate is supported by legs 6 and is preferably partly cut away to save weight and provide circulation of air, two circular openings 7 being cut in the frame for this purpose, as shown in the drawing. Two hot plates 8, 9 are pivotally mounted in the frame on parallel horizontal axes so that they may be moved into a vertical position in opposed spaced relation as shown in Figs. 1 and 6.

The construction and relation to other parts of each of the hot plates is the same, so that a description of one will suffice for both. Means for holding and supporting a hot plate consists of a hot-plate frame 10 of rectangular outline having a plane upper face and a central circular depression 11, adapted to receive and support a hot plate. Depending from the rear edge of the hot plate frame are apertured ears 12 which are pivotally engaged with pins 13 projecting laterally from the upper ends of brackets 14, the bases 14ª of which are slotted as indicated at 14ᵇ and rest upon the face of the base plate 1. Bolts 15 are passed through the slots and through the base plates to secure the brackets in position. In order to provide a simple and effective mounting for these brackets the base plate has cast or otherwise formed thereon three upwardly projecting lugs 16, 17, 18, the lugs 16 and 17 engaging the outer edges of the base 14ª of the brackets and the lug 18 forming an abutment for the end of said base. The upper edge of the hot plate frame is provided with an outwardly projecting lip or flange 19 which is adapted to engage lugs 20 projecting from the inner faces of the end members of the main frame. The vertical wall of the depression 11 in the hot plate frame is provided with a plurality of inwardly projecting shoulders or abutments 21 which form a support for the hot-plate. The bottom of the hot plate rests upon these abutments and is firmly engaged therewith by bolts 22 which extend through the margin of the hot plate and through the bottom of the hot plate frame. The abutments upon which the hot plate rests support the hot plate above the bottom of the hot plate frame, thus providing a space for conveniently housing circuit wires 23 which are suitably connected to a plug 24 and to switches 25, the ends of the wires being passed through an eyelet 26 in the wall of the depression in the hot plate frame and connected to the respective ends of an electric heating wire 27 seated in a recess in the upper face of the hot plate, according to well-known practice. The bottom of the hot plate frame is provided with a plate 28 of heat insulating material.

The pivotal axes of the hot plates are parallel and so related to each other that when the hot plates are raised into vertical position a space is formed between the heating elements of the proper width to receive an open-work holder 29 for steak, chops, or the like and which supports the same between the hot plates for grilling. The hot plates may be held in vertical position by any suitable means. As shown, the means consists of a latch 30, pivotally mounted intermediate its ends on the base plate, as indicated at 31, and provided with a finger piece 32 at its outer end and with an upstanding lug 33 at its inner end, which is beveled in two directions, namely, downwardly and outwardly toward the side and downwardly toward the center of the base plate, as clearly shown in Figs. 6 and 7. The beveled surface of this lug cooperates with a like beveled surface on the ear 12. A coil spring 34 is connected to the latch and to the base plate to give the lug 33 an outward bias.

A cross-plate 35 extends from the upper edge of one side frame to the upper edge of the other between the inner edges of the hot plate frames, to form therewith a plane or flush upper surface when the hot plates are in cooking position. A depression or groove 36 may be formed in the cross-plate to catch drippings when the device is used as a broiler, and this groove may be extended to the end of the cross-plate, if desired, to permit the drippings to be poured off or run off while broiling is in progress.

As a convenient means for holding objects between the hot plates when used as a broiler, or toaster, the outer ends of the hot plate frames are provided with notches 37 to support an open-work holder, comprising two grid members 38, 38ᵃ hinged together, as shown at 39, and provided with outwardly projecting handles 40, adapted to seat in the notches 37 in the hot plate frames, as shown in Fig. 1. These grids are preferably provided with inwardly projecting prongs 41 upon which the object may be impaled and suspended between the opposed hot plates.

When the hot plates are in their lowered position the lugs 33 on the latches 30, are drawn against the gears 12 on the hot plate frame by the spring 34 so that when these frames are raised into a vertical position the lugs are automatically moved by the spring 34 into locking engagement and hold the frames firmly in their raised position.

From the above description it will be seen that I have provided an electric utensil which may be used for cooking purposes, or may be quickly converted into an electric grill or toaster having opposed heating elements operating simultaneously on opposite sides of the object. It is obvious that other means may be employed for mounting the hot plates whereby they may be used for cooking or may be brought into opposed spaced relation, either in a vertical or other position, and that the structure shown may be widely varied within the principles herein disclosed. It is therefore to be understood that the invention is not to be confined to the construction shown, but includes all changes, substitutions and modifications falling within the principles disclosed within the terms of the appended claims.

What I claim is:

1. A combined electric cooking stove and grill comprising, a supporting frame, and a pair of hot plates pivotally mounted thereon, the pivotal points being spaced apart and disposed below the plane of the upper surfaces of the plates and adjacent to the opposed ends of the latter, said hot plates being adapted to lie horizontally for general cooking purposes or to be moved to opposed spaced relation in vertical planes to heat an object simultaneously on opposite sides with direct radiant heat.

2. A combined electric stove and grill, comprising, a supporting frame, a pair of hot plates pivotally mounted thereon, the pivotal points being spaced apart and disposed below the plane of the upper surfaces of the plates and adjacent to the opposed ends of the latter, said hot plates being adapted to lie horizontally for general cooking purposes or to be moved to opposed spaced relation in vertical planes to heat an object simultaneously on opposite sides with direct radiant heat, and means for holding said plates releasably in vertical position.

3. A combined electric stove and grill comprising, a supporting frame, two hot plates pivotally mounted on parallel axes on the supporting frame, said axes being disposed at the adjacent ends of the plates, the latter being adapted to lie horizontally for general cooking purposes or to be moved for opposed spaced relation in vertical planes to heat an object simultaneously on opposite sides, and an open-work holder for the object to be grilled mounted between the opposed plates in their vertical position.

4. An open-work holder comprising, two pivotally connected open-work frames, each of said frames being provided with a handle extended outwardly at right angles to the plane of the frame, said handles also being adapted to act as supports for the holder when placed between opposed upright heating elements.

5. A combined electric cooking stove and broiler comprising, a body frame, two horizontally disposed heating elements supported thereon at its opposite ends, a tray disposed between and completing the top surface of the frame, the heating elements being movably mounted and adapted to be raised to vertically opposed positions, respectively, at the two sides of the tray, and conducting wires to furnish electric current to the heating elements in all positions.

6. A combined electric cooking stove and broiler comprising, a body frame, two horizontally disposed heating elements mounted in its opposite ends, a tray disposed between and completing the top surface of the frame, the heating elements being movably mounted and adapted to be raised separately to a vertical position upon the two respective sides of the tray, and conducting wires to furnish electric current to the elements in all positions.

7. A combined electric cooking stove and broiler comprising, a body frame, two horizontally disposed heating elements supported thereon at its opposite ends, a tray disposed between and completing the top surface of the frame, the heating elements being movably mounted and adapted to be raised to vertically opposed positions, respectively, at the two sides of the tray, conducting wires to furnish electric current to the heating elements in all positions, and means to hold the heating elements releasably in vertical position.

8. A combined electric cooking stove and broiler comprising, a body frame, two horizontally disposed heating elements mounted in its opposite ends, a tray disposed between and completing the top surface of the frame, the heating elements being movably mounted and adapted to be raised separately to a vertical position upon the two respective sides of the tray, conducting wires to furnish electric current to the elements in all positions, and means to hold the heating elements releasably in vertical position.

9. A combined electric cooking stove and broiler comprising, a body frame, two horizontally disposed heating elements supported thereon at its opposite ends, a tray disposed between and completing the top surface of the frame, the heating elements being movably mounted and adapted to be raised to vertically opposed positions, respectively, at the two sides of the tray, conducting wires to furnish electric current to the heating elements in all positions, beveled members mounted on said body frame adjacent the opposed edges of said heating elements, and cooperating beveled lugs pivotally mounted adjacent said beveled members and adapted to be moved into engagement therewith to hold said heating elements releasably in vertical opposed positions.

10. A combined electric cooking stove and boiler comprising, a body frame, two horizontally disposed heating elements supported thereon at its opposite ends, a tray disposed between and completing the top surface of the frame, the heating elements being movably mounted and adapted to be raised to vertically opposed positions, respectively, at the two sides of the tray, conducting wires to furnish electric current to the heating elements in all positions, beveled members mounted on said body frame adjacent the opposed edges of said heating elements, and cooperating beveled lugs pivotally mounted adjacent said beveled members and adapted automatically to be moved into engagement therewith to hold said heating elements releasably in vertical opposed positions.

11. A combined electric cooking stove and broiler comprising, a body frame, two horizontally disposed heating elements mounted in its opposite ends, a tray disposed between and completing the top surface of the frame, the heating elements being movably mounted and adapted to be raised separately to a vertical position upon the two respective sides of the tray, conducting wires to furnish electric current to the elements in all positions, means to hold the heating elements releasably in vertical position, and an openwork holder for the object to be broiled removably mounted above said tray.

Signed by me this 3rd day of March, 1927.

EARL V. COULSTON.